K. W. ZIMMERSCHIED.
PYROMETER.
APPLICATION FILED JUNE 28, 1913.
1,142,133.
Patented June 8, 1915.
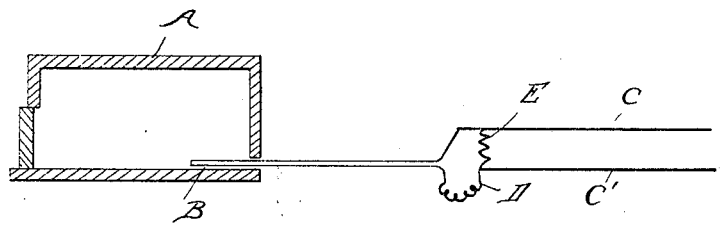
Witnesses
W. K. Ford
James P. Barry
Inventor
Karl W. Zimmerschied
By Whittemore Hulbert & Whittemore
Atty's

UNITED STATES PATENT OFFICE.

KARL W. ZIMMERSCHIED, OF DETROIT, MICHIGAN.

PYROMETER.

1,142,133.　　　　Specification of Letters Patent.　　Patented June 8, 1915.

Application filed June 23, 1913. Serial No. 776,352.

*To all whom it may concern:*

Be it known that I, KARL W. ZIMMERSCHIED, a citizen of the United States of America, residing at Detroit, in the county of Wayne and State of Michigan, have invented certain new and useful Improvements in Pyrometers, of which the following is a specification, reference being had therein to the accompanying drawings.

The invention relates to pyrometers of that type employing thermo-electric couples, and has for its object the standardizing of the couples so as to eliminate variations due to individual characteristics.

In the present state of the art two methods of using thermo-electric couples have been employed. The one is the placing of the couple in a simple galvanometer circuit. Another, and in many respects superior and more accurate method is to place the couple in circuit with a potentiometer, the reading being taken when the electromotive force from the couple and potentiometer are in balance. With the first method, the individual characteristics of the couple may be corrected by the placing of a small amount of series resistance in circuit therewith, but with the second method resistance so placed will have absolutely no influence upon the indicated electromotive force. The present invention overcomes this difficulty by the provision of a corrective for the couple, which is effective when used with a potentiometer, and which will eliminate individual characteristics, conforming all of the couples to a predetermined standard. This is preferably accomplished by introducing, in addition to the series resistance, a shunt, the combination of the shunt and series then becoming the adjustable feature. By proper manipulation of the amounts of shunt and series resistance, any desired portion of the electromotive force may be sent to the instrument, the balance leaking off the main circuit and through the shunt. In this way couples varying widely in electromotive force may all be brought to a common standard, and hence made interchangeable with each other.

In the drawing, which is a diagram, A is a furnace or other chamber, the temperature of which is to be indicated. B is the thermo-electric couple. C and C' are the leads extending from the couple to the potentiometer (not shown). D is a series resistance, and E is a shunt resistance, both of which are permanently attached to the couple.

In the manufacture of the couple, the resistances D and E are adjusted to compensate for variations in the individual characteristics of the couples so as to standardize the same. Thus any couple so standardized may be exchanged for any other without variation in the operation of the instrument.

What I claim as my invention is:

1. A renewable thermo-electric couple unit comprising shunt and series resistances, proportioned to correct individual characteristics of the couple.

2. The combination in a circuit, including the leads to a potentiometer, a thermo-couple, and shunt and series resistances in said circuit proportioned to correct individual characteristics of the couple.

In testimony whereof I affix my signature in presence of two witnesses.

KARL W. ZIMMERSCHIED.

Witnesses:
　CHAS. H. JUMPER,
　CLARA L. MORRISON.